US010773857B2

(12) United States Patent
Ruddell et al.

(10) Patent No.: US 10,773,857 B2
(45) Date of Patent: Sep. 15, 2020

(54) RESEALABLE BAG WITH CUTTING MECHANISM

(71) Applicants: Gregory Roy Ruddell, Aldergrove (CA); Robert J. Halas, Surrey (CA)

(72) Inventors: Gregory Roy Ruddell, Aldergrove (CA); Robert J. Halas, Surrey (CA)

(*) Notice: Subject to any disclaimer, the term of this patent is extended or adjusted under 35 U.S.C. 154(b) by 0 days.

(21) Appl. No.: 15/926,224

(22) Filed: Mar. 20, 2018

(65) Prior Publication Data

US 2018/0370688 A1    Dec. 27, 2018

Related U.S. Application Data

(63) Continuation of application No. 14/403,130, filed as application No. PCT/CA2013/050389 on May 21, 2012, now Pat. No. 9,919,845, which is a continuation-in-part of application No. 13/476,733, filed on May 21, 2012.

(51) Int. Cl.
*B65D 33/25* (2006.01)
*B65D 33/00* (2006.01)
*B65D 33/16* (2006.01)

(52) U.S. Cl.
CPC .......... *B65D 33/2591* (2013.01); *B65D 33/00* (2013.01); *B65D 33/1658* (2013.01); *B65D 33/1675* (2013.01); *B65D 33/25* (2013.01); *Y02W 30/807* (2015.05); *Y10T 24/15* (2015.01)

(58) Field of Classification Search
CPC ............... B65D 33/00; B65D 33/2591; B65D 33/1658; B65D 33/25; B65D 33/1675; B65B 69/0033; Y10T 24/15; Y10T 24/2564; Y10T 24/2561; Y10T 24/2532; Y10T 24/2568; Y02W 30/807; A44B 19/267
USPC ........................................... 383/64, 202, 200
See application file for complete search history.

(56) References Cited

U.S. PATENT DOCUMENTS

| | | | | |
|---|---|---|---|---|
| 5,622,431 A | * | 4/1997 | Simonsen | B65D 33/1658 24/585.12 |
| 6,287,000 B1 | * | 9/2001 | Buchman | B65D 33/2591 24/399 |
| 9,919,845 B2 | * | 3/2018 | Ruddell | B65D 33/1658 |

* cited by examiner

*Primary Examiner* — Jes F Pascua
*Assistant Examiner* — Matthew T Theis

(57) ABSTRACT

A sealing and cutting assembly for engaging a bag to cut and reseal the bag comprises a first sealing strip and a second sealing strip connected at corresponding ends thereof and engaging both sides the bag therebetween. A slider block is movable along the first sealing strip and the second sealing strip. Movement of the slider block in a first direction bringing the first sealing strip and the second sealing strip into sealing engagement with one another to seal the bag, and movement of the slider block in a second direction releasing the first sealing strip and the second sealing strip from said sealing engagement to open the bag. A cutting mechanism mounted on the slider block, wherein the cutting mechanism moves with the slider block along the first sealing strip and the second sealing strip.

16 Claims, 13 Drawing Sheets

RESEALABLE BAG WITH CUTTING MECHANISM

BACKGROUND OF THE INVENTION

Field of the Invention

The present invention relates to a resealable bag and, in particular, to a resealable bag provided with a cutting mechanism for initially opening and subsequently trimming the bag.

Description of the Related Art

Consumer food products are increasingly being packaged in resealable bags as a convenience for consumers who only use a portion of the food product at any given time. The ability to reseal the bag after a portion of the food product has been used allows consumers to conveniently store the food product in its original packaging. Conventional resealable bags generally comprise a slider sealing mechanism which includes mating male and female sealing strips and a slider mounted on the sealing strips. The sealing strips are on opposite sides of the bag adjacent to the mouth thereof and the bag is unsealed and resealed by movement of the slider along the sealing strips. An example of a conventional resealable bag is disclosed in U.S. Pat. No. 5,836,056 which issued to Porchia et al. on Nov. 17, 1998 and the full disclosure of which is incorporated herein by reference.

SUMMARY OF THE INVENTION

It is an object of the present invention to provide an improved resealable bag.

There is accordingly provided a combination sealing and cutting assembly for a bag. The combination sealing and cutting assembly comprises a first sealing strip and a second sealing strip. The first sealing strip and second sealing strip are connected at their corresponding ends. A slider block is movable along the first sealing strip and the second sealing strip. Movement of the slider block in a first direction brings the first sealing strip and the second sealing strip into sealing engagement with one another while movement of the slider block in a second direction releases the first sealing strip and the second sealing from said sealing engagement. A cutting mechanism is mounted on the slider block and moves with the slider block along the first sealing strip and the second sealing strip. The cutting mechanism has an operational position and a non-operational position. When the cutting mechanism is in the operational position, the bag is cut when the cutting mechanism moves with the slider block along the first sealing strip and the second sealing strip. When the cutting mechanism is in the non-operational position, the bag is not cut when wherein the cutting mechanism moves with the slider block along the first sealing strip and the second sealing strip.

There is also provided a resealable bag comprising a track extending along a side edge of the bag. There is a first sealing strip and a second sealing strip connected at their ends. A coupling is connected to the first sealing strip and the second sealing strip. The coupling is movable along the track so as to allow the first sealing strip and the second sealing strip to move along the bag. A slider block is movable along the first sealing strip and the second sealing strip. Movement of the slider block in a first direction brings the first sealing strip and the second sealing strip into sealing engagement to seal the bag. Movement of the slider block in a second direction releases the first sealing strip and the second sealing from said sealing engagement to open the bag. A cutting mechanism is mounted on the slider block and moves with the slider block along the first sealing strip and the second sealing strip. The cutting mechanism has an operational position and a non-operational position. When the cutting mechanism is in the operational position, the bag is cut when the cutting mechanism moves with the slider block along the first sealing strip and the second sealing strip. When the cutting mechanism is in the non-operational position, the bag is not cut when wherein the cutting mechanism moves with the slider block along the first sealing strip and the second sealing strip.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
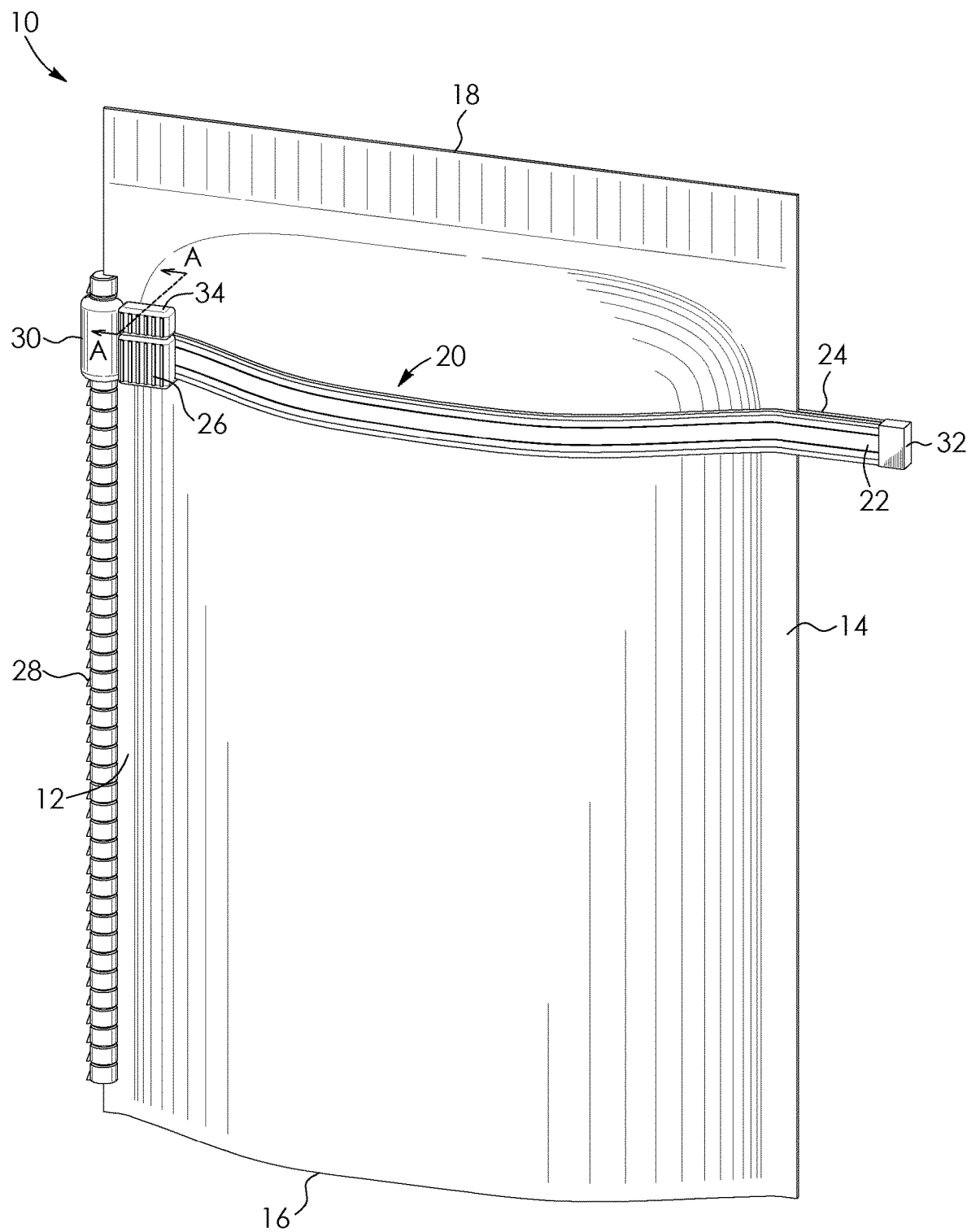
FIG. 1 is a front perspective view of an improved resealable bag provided with a cutting mechanism for initially opening and subsequently trimming the bag.
Figure 10:
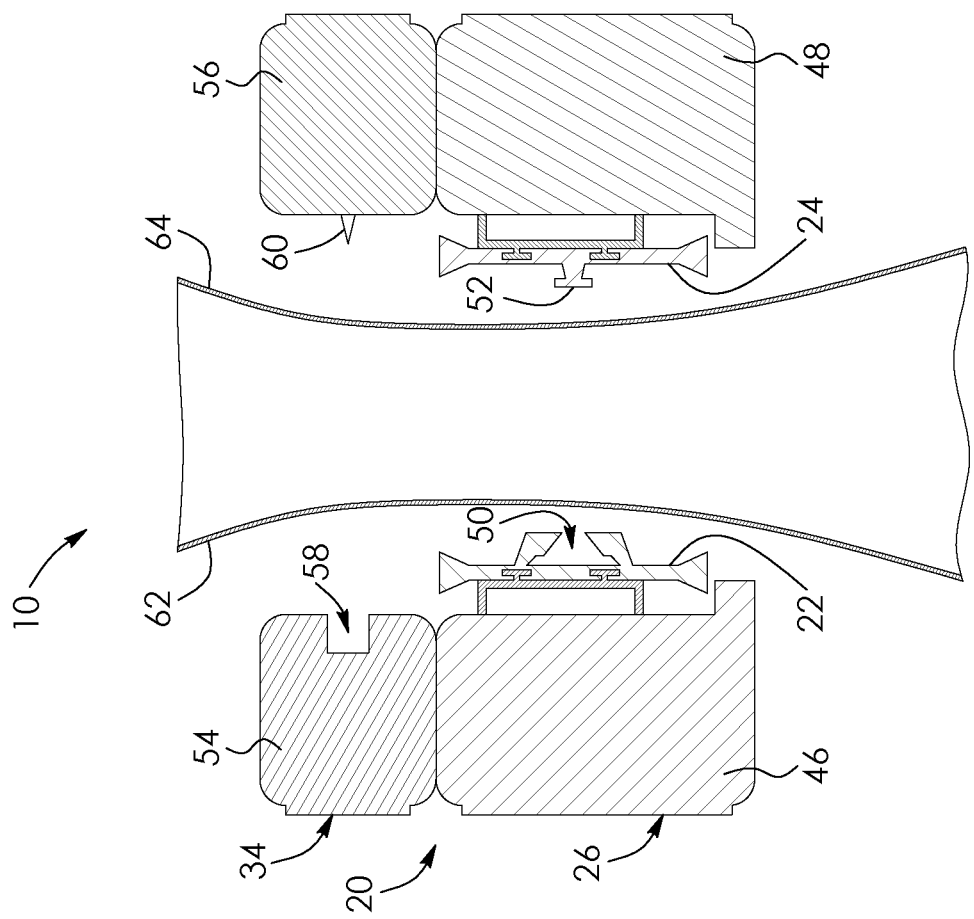
FIG. 10 is a sectional view of the sealing mechanism and cutting mechanism of the resealable bag of FIG. 1 illustrating the sealing mechanism when the bag is open.
Figure 12:
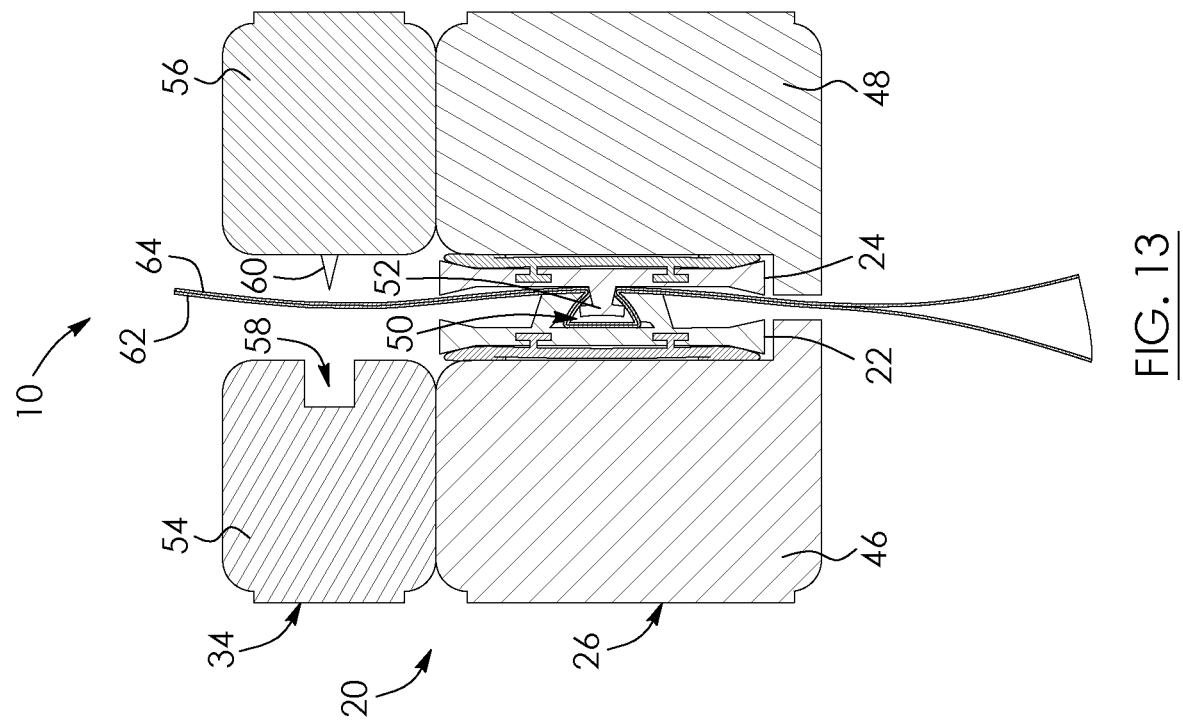
FIG. 12 is another sectional view of the sealing mechanism and cutting mechanism of the resealable bag of FIG. 1 illustrating the sealing mechanism in an intermediate position as the bag is being resealed.
Figure 13:
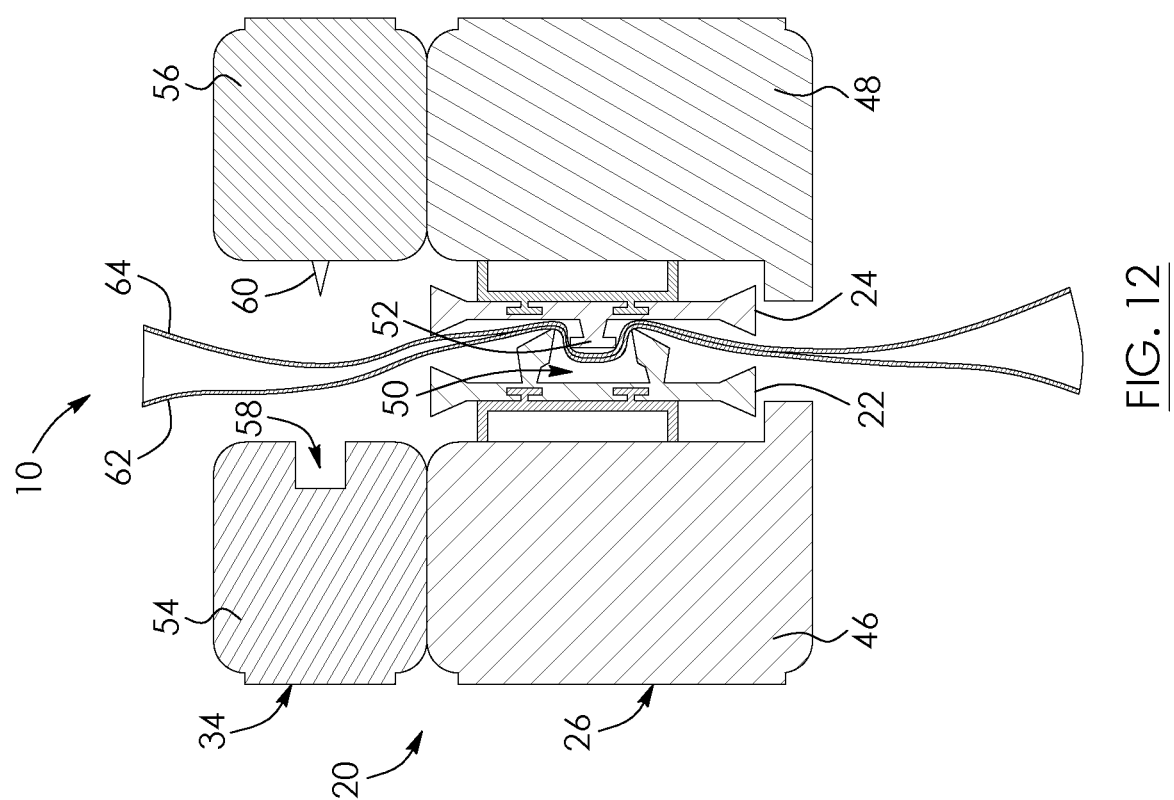
FIG. 13 is a sectional view of the sealing mechanism and cutting mechanism of the resealable bag of FIG. 1 illustrating the sealing mechanism when the bag is resealed.

Referring to the drawings and first to FIG. 1 there is shown a resealable bag 10 which generally comprises rectangular sides 62 and 64, as identified in FIG. 10, joined together by side edges in the form of a first side edge flap 12 and a second side edge flap 14. The bag also has a closed bottom end 16 extending between the side edge flaps and an initially closed top end 18 extending between the side edge flaps. There is a sealing mechanism 20 extending transversely across the bag 10 which allows the bag 10 to be resealed after the bag 10 is opened near its top end 18. The sealing mechanism 20 includes conventional sealing strips 22 and 24 on opposite sides of the bag 10 and a slider block 26 which is movable along the sealing strips 22 and 24. Movement of the slider block 26 along the sealing strips 22 and 24 in a first direction brings the sealing strips 22 and 24 into sealing engagement with one another and thereby seals the open bag. Movement of the slider block 26 along the sealing strips 22 and 24 in a second direction releases the sealing strips 22 and 24 from one another and thereby opens the resealed bag. Accordingly, as thus far described, the bag 10 is conventional.

However, the bag 10 disclosed herein further includes a track 28 which extends along the first side edge flap 12 of the bag 10. The sealing mechanism 20 is coupled to the track 28 by a coupling 30 which is connected to each of the sealing strips 22 and 24. Furthermore, unlike conventional resealable bags, the sealing strips 22 and 24 of the sealing mechanism 20 extend beyond the second edge flap 14 of the bag 10. Ends of the sealing strips 22 and 24 which are opposite to the coupling 30 are fused together by an end cap 32. There is also a cutting mechanism 34 which, in this example, is mounted on the slider block 26. In other examples, the cutting mechanism and the slider block may be monolithic. The bag 10 may be made from a plastic material and may be used as packaging for food products in which case the bag 10 would be initially sealed as shown in FIG. 1.

Figure 2:
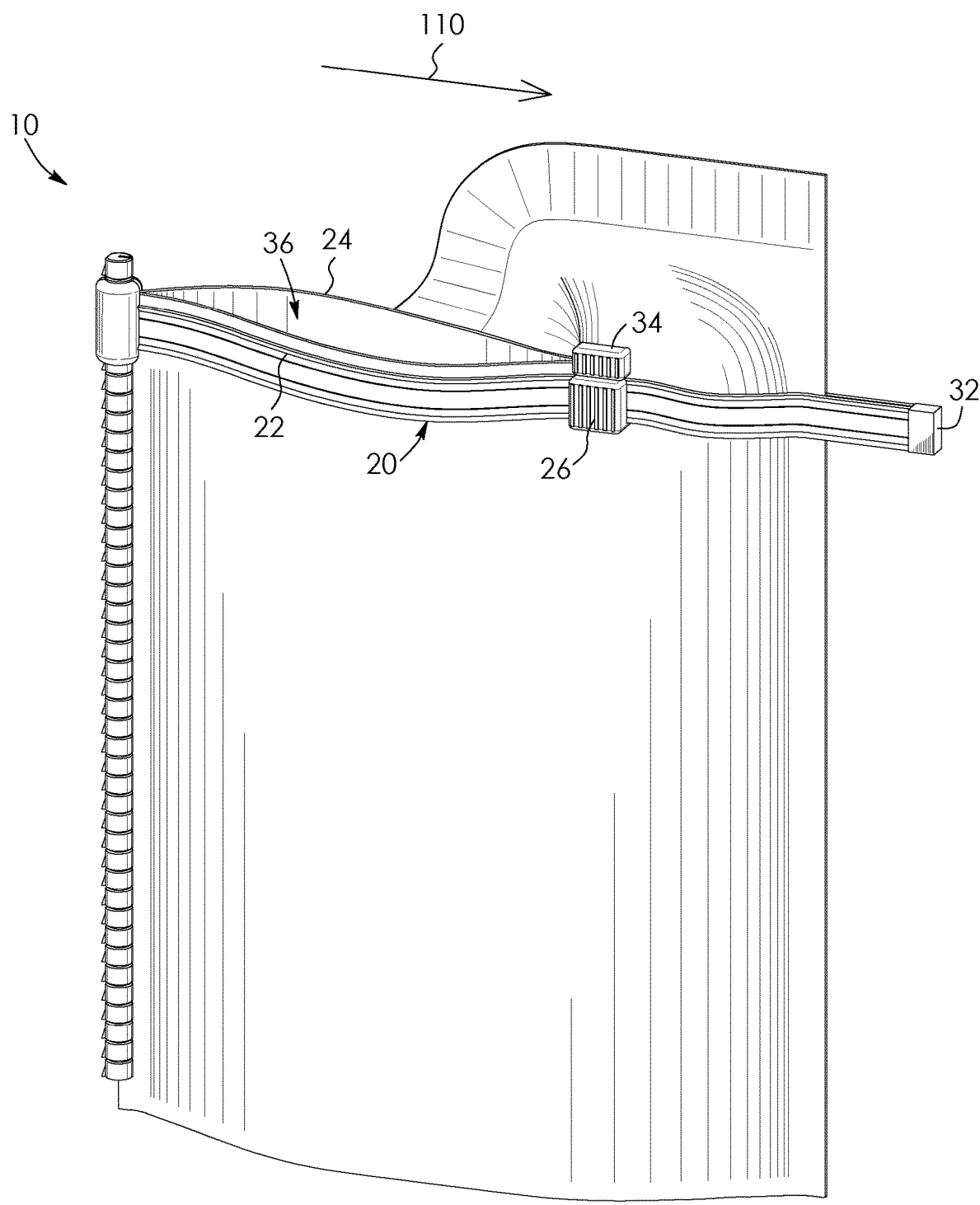
FIG. 2 is a front perspective view of the resealable bag of FIG. 1 illustrating the cutting mechanism being used to initially open the bag.
Figure 3:
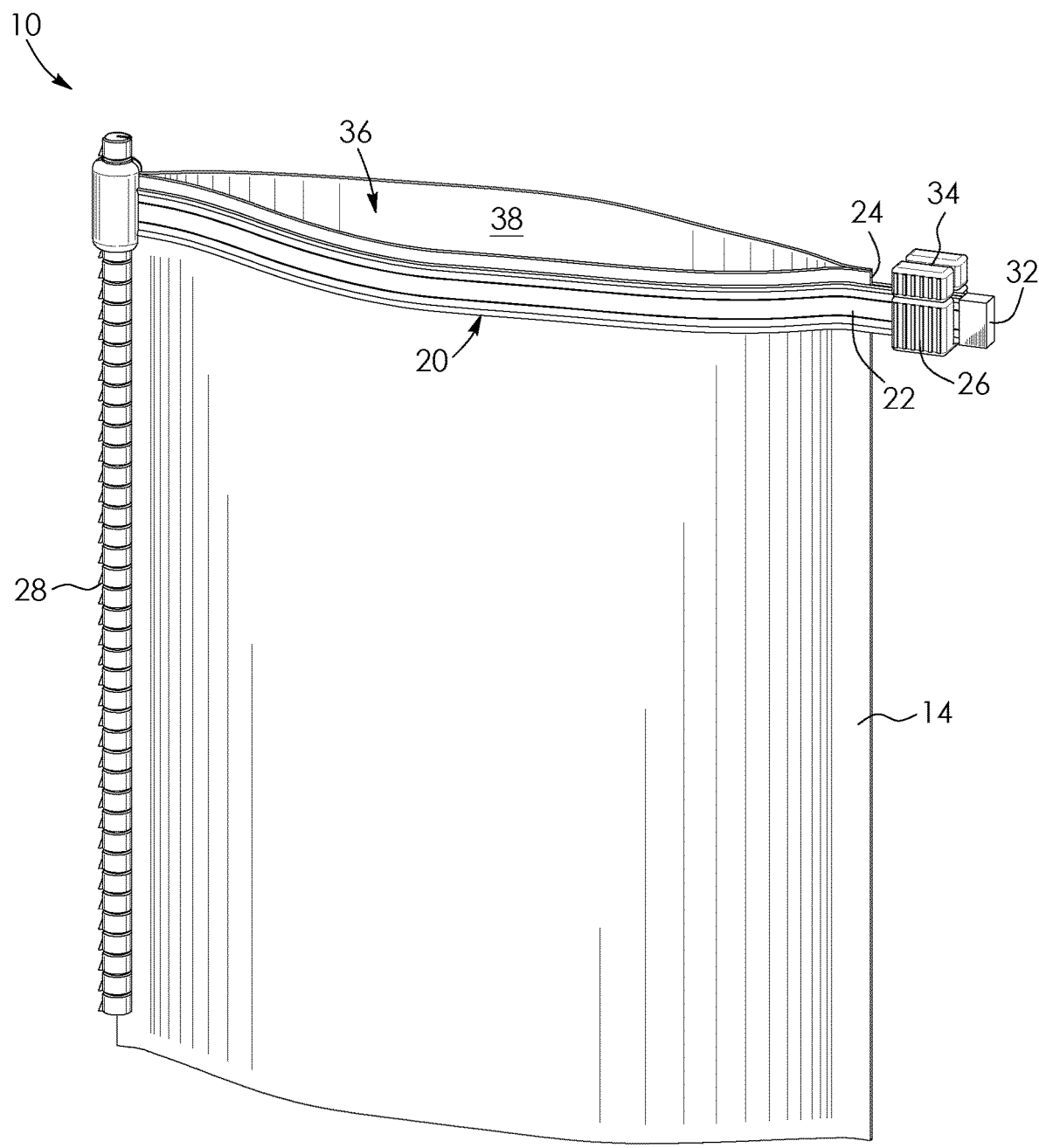
FIG. 3 is a front perspective view of the resealable bag of FIG. 1 illustrating the bag after having been opened with the cutting mechanism.
Figure 4:
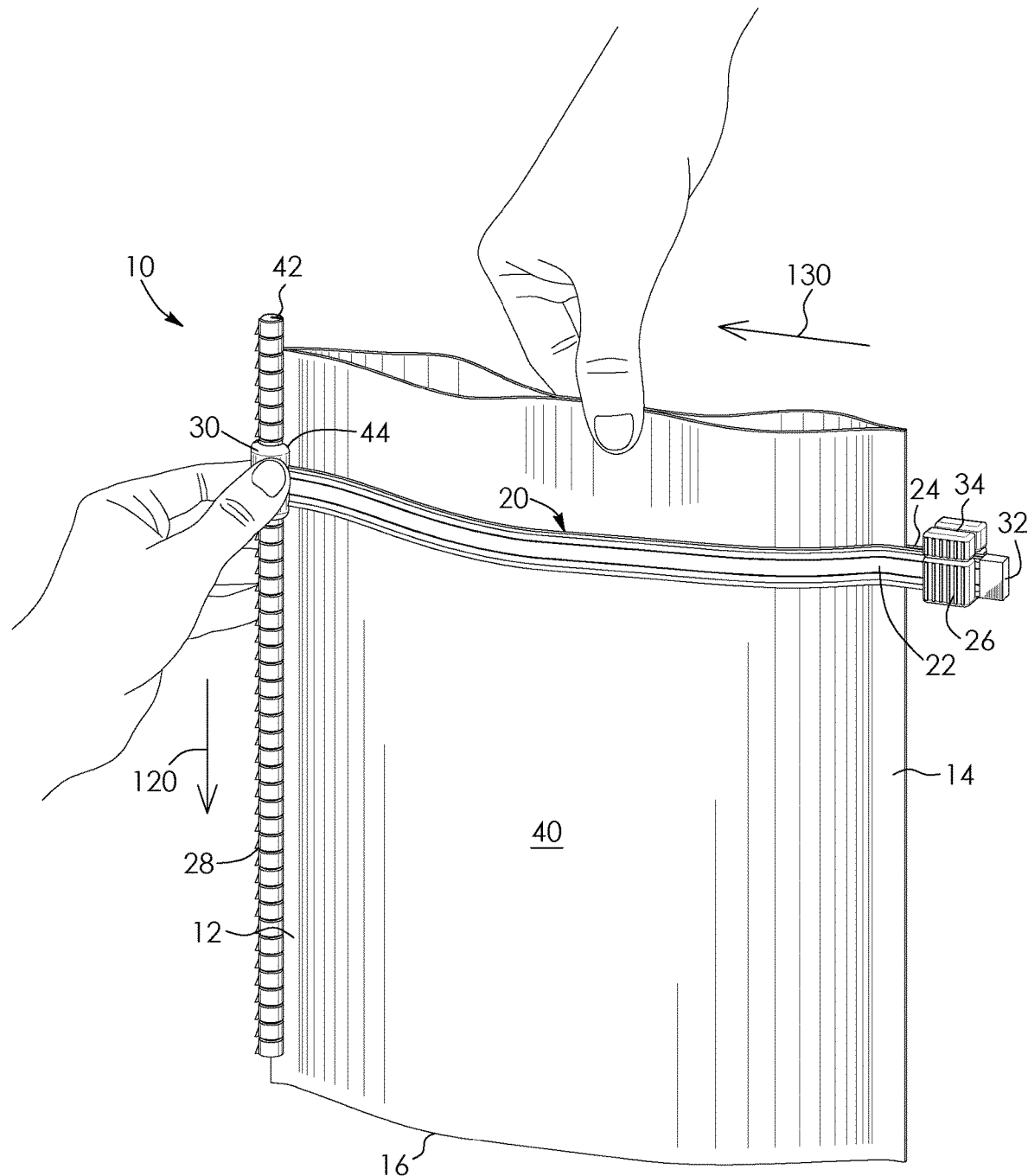
FIG. 4 is a front perspective view of the resealable bag of FIG. 1 illustrating a sealing mechanism thereof being moved along a track.

The sealed bag 10 is opened as shown in FIG. 2 by moving the slider block 26 along the sealing strips 22 and 24 in the direction generally indicated by arrow 110. This causes the slider block 26 to release the sealing strips 22 and 24 from one another while the cutting mechanism 34, which moves together with the slider block 26, simultaneously cuts the bag 10 open. FIG. 3 shows the cut bag 10 with an open-mouth 36 to allow access to an interior 38 of the bag 10. In the fully open position shown in FIG. 3 the slider block 26 and cutting mechanism 34 are disposed beyond the second edge flap 14 of the bag 10. This allows the sealing mechanism 20 to be slid along the track 28 towards the bottom of the bag 10 as shown in FIG. 4 and described below.

Figure 5:
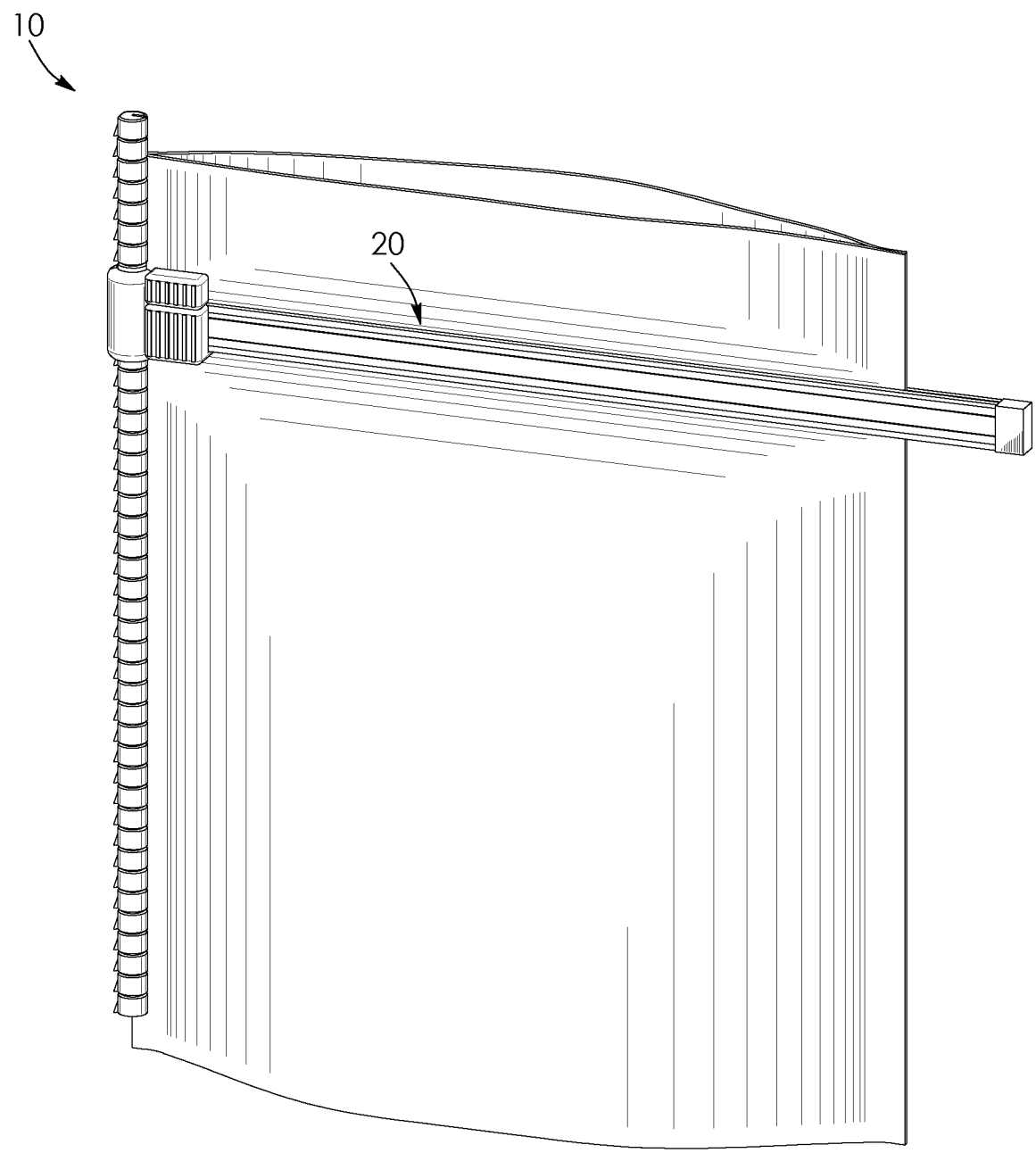
FIG. 5 is a front perspective view of the resealable bag of FIG. 1 illustrating the previously opened bag being resealed.

The first side edge flap 12 of the bag 10 is received by a groove 42 in the track 28 and a groove 44 in the coupling 30. The grooves 42 and 44 are aligned and are disposed between the sealing strips 22 and 24 which are connected to the coupling 30. The sealing mechanism 20 is thereby able to move along the track 28 when the bag 10 is in the fully open position because both side edge flaps 12 and 14 are free of the sealing strips 22 and 24. This allows the sealing mechanism 20 to move about a body 40 of the bag 10 as the coupling 30 moves along the track 28 in the direction generally indicated by arrow 120. Movement of the coupling 30 along the track 28, and by extension movement of the sealing mechanism 20 along the body 40 of the bag 10, in the direction generally indicated by arrow 120 is desirable after the bag 10 has been opened as it allows the open-mouthed bag 10 to be resealed by moving the slider block 26 along the sealing strips 22 and 24 in the direction generally indicated by arrow 130 which will brings the sealing strips 22 and 24 into sealing engagement with one another and thereby reseals the open bag 10. The resealed open-mouthed bag 10 is shown in FIG. 5.

Figure 6:
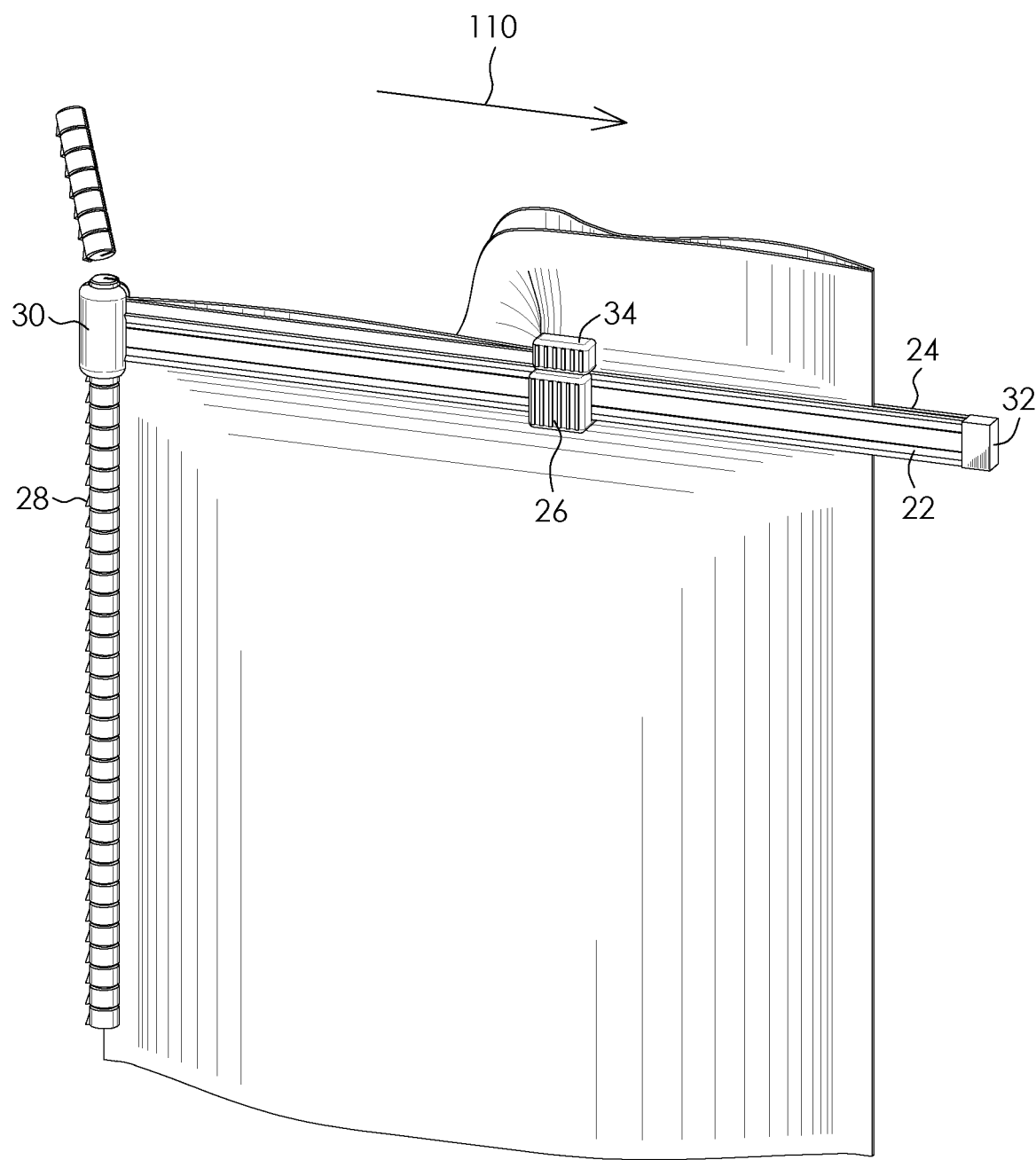
FIG. 6 is a front perspective view of the resealable bag of FIG. 1 illustrating the cutting mechanism being used to trim the bag.
Figure 7:
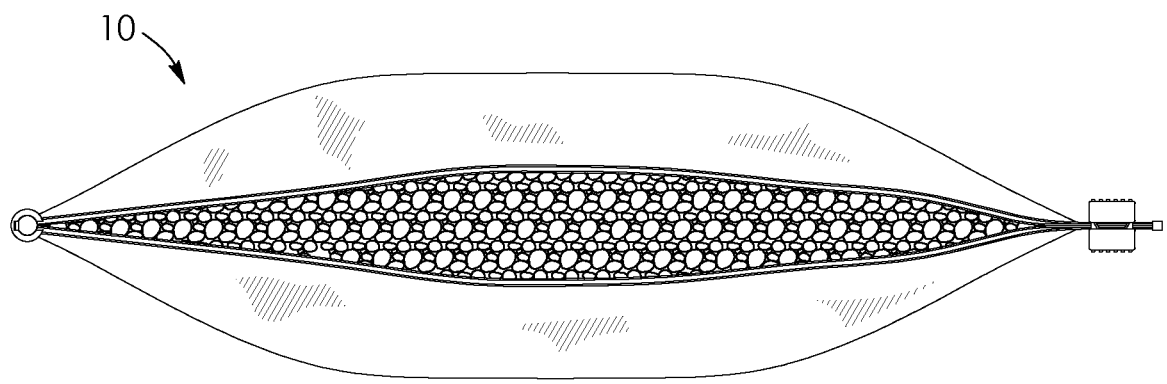
FIG. 7 is a top plan view showing the trimmed bag of FIG. 1 fully open.
Figure 8:
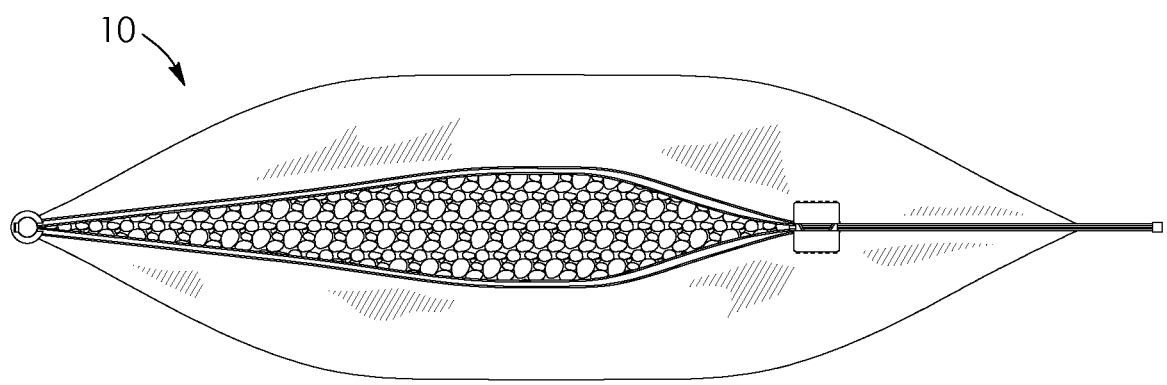
FIG. 8 is a top plan view showing the trimmed bag of FIG. 1 partially open.
Figure 9:
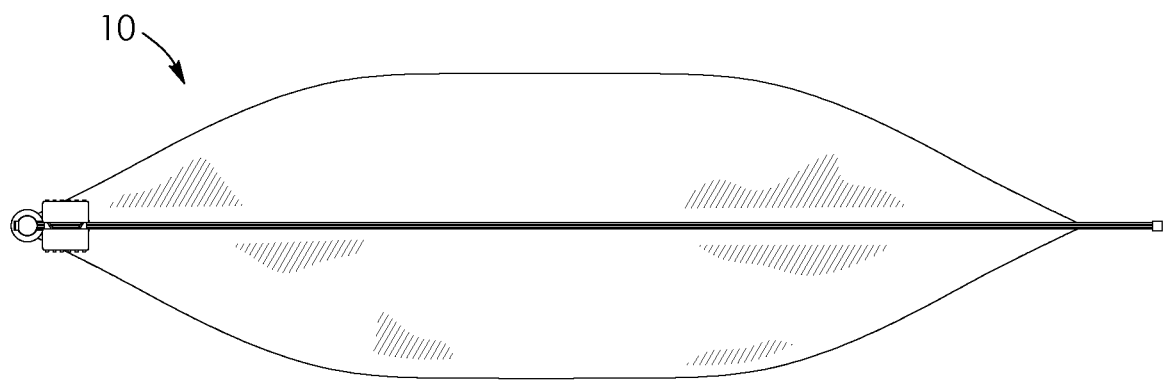
FIG. 9 is a top plan view showing the trimmed bag of FIG. 1 resealed.
Figure 11:
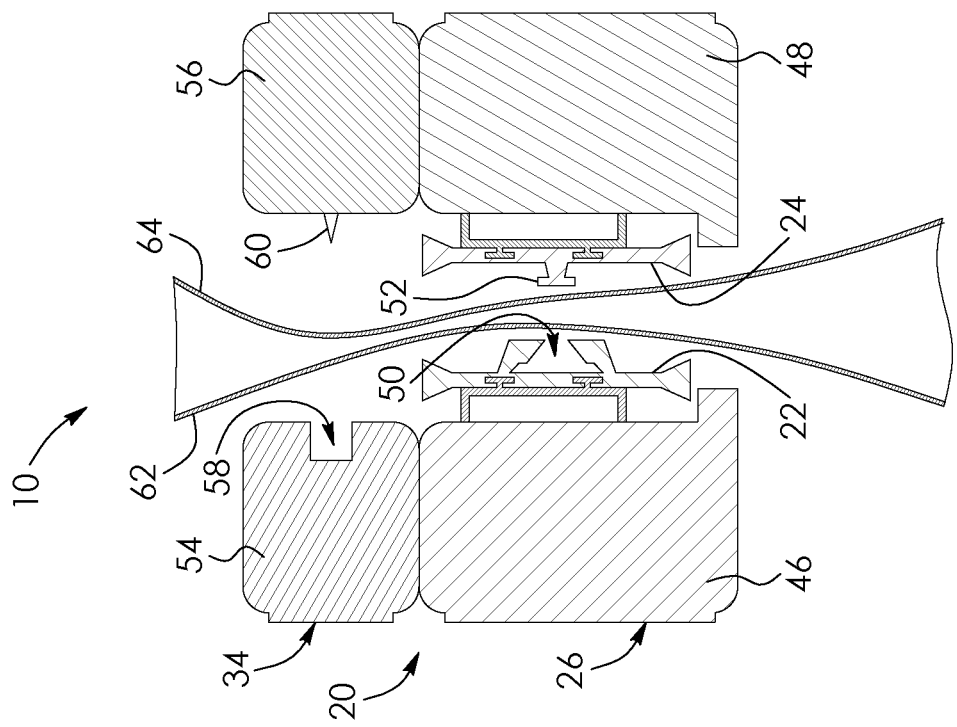
FIG. 11 is a sectional view of the sealing mechanism and cutting mechanism of the resealable bag of FIG. 1 illustrating the sealing mechanism in an intermediate position as the bag is being resealed.

The bag 10 disclosed herein can also be trimmed as the contents of the bag is consumed to reduce the size of the bag. The bag 10 is trimmed as best shown in FIG. 6 by moving the slider block 26 along the sealing strips 22 and 24 in the direction generally indicated by arrow 110. This causes the slider block 26 to release the sealing strips 22 and 24 from one another while the cutting mechanism 34, which moves in the tandem with slider block 26, simultaneously trims the bag 10. The resealing and trimming the bag 10 described above and shown in FIGS. 4 to 6 may be repeated as the contents of the bag 10 are consumed. Alternatively, it is possible to merely open and reseal the bag 10 without trimming of the bag as shown in FIGS. 7 to 9.

The sealing mechanism 20 is shown in greater detail in FIGS. 10 to 13. The slider block 26 has a first portion 46 and second portion 48 which are each connected to a corresponding one of the sealing strips 22 and 24. In this example, one of the sealing strips 22 is a female sealing strip provided with an elongate recess 50 which extends substantially a length thereof and another of the sealing strips 24 is a male sealing strip provided with an elongate key 52 which extends substantially the length thereof. The cutting mechanism 34 is also shown in greater detail in FIGS. 10 to 13 and has a first portion 54 and a second portion 56. The first portion 54 of the cutting mechanism 34 is mounted on the first portion 46 of the slider block 26 and the second portion 56 of the cutting mechanism 34 is mounted on the second portion 48 of the slider block 26. The first portion 54 of the cutting mechanism 34 is provided with a recess 58 and the second portion 56 of the cutting mechanism 34 is provided with a blade 60. The first portion 46 of the slider block 26, the female sealing strip 22, and the first portion 54 of the cutting mechanism 34 are located outside a first side 62 of the bag 10. The second portion 48 of the slider blocker 26, the male sealing strip 24, and the second portion 56 of the cutting mechanism 34 are located outside a second side 64 of the bag 10.

Figure 14:
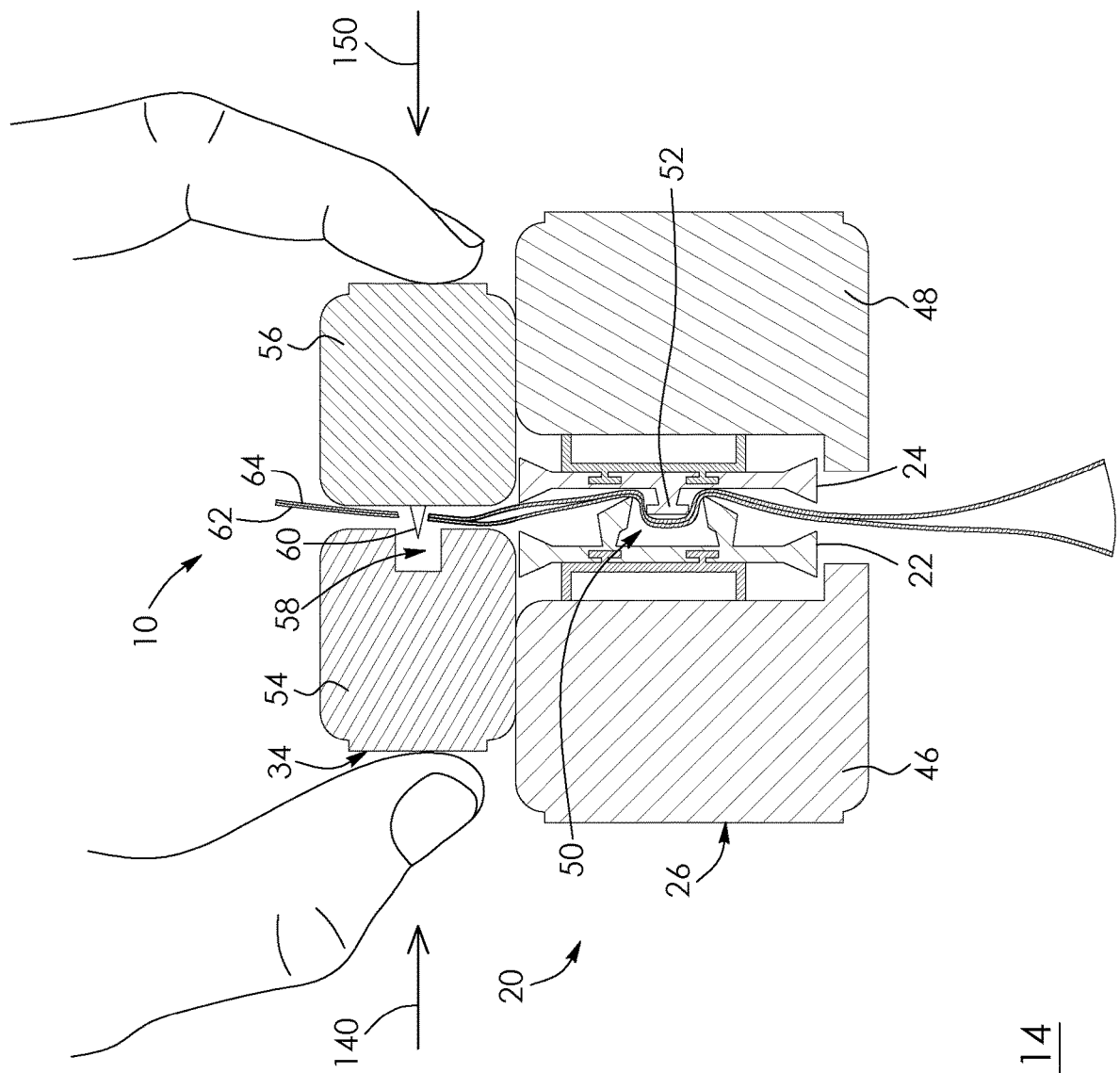
FIG. 14 is a sectional view of the sealing mechanism and cutting mechanism of the resealable bag of FIG. 1, taken along lines A-A, illustrating the cutting mechanism being used to initially open or trim the bag.

The cutting mechanism 34 does not necessarily cut the bag 10 as shown in FIGS. 10 to 13 in which the cutting mechanism 34 is shown in a non-operation position. When the cutting mechanism 34 is in the non-operation position it is possible to open and reseal the bag without cutting the bag 10. To cut the bag 10 it is necessary to actuate the cutting mechanism 34 to an operational position as shown in FIG. 14. The cutting mechanism 34 is actuated to the operational position by applying opposing forces to the first portion 54 and second portion 56 of the cutting mechanism 34, i.e. squeezing the portion 54 and the second portion 56 of the cutting mechanism 34 together, as indicated generally by arrows 140 and 150. This causes the blade 60 to pierce through both sides 62 and 64 of the bag 10 and be at least partially received within the recess 58. The blade 60 then cuts the bag 10 as the blade 60 is moved along the sealing strips 22 and 24 with the slider block 26 as best shown in FIGS. 2 and 6. In this example, the bag 10 is cut when the slider block 26 moves along the sealing strips 22 and 24 in a direction which releases the sealing strips 22 and 24 from one another to open the bag 10.

Figure 15:
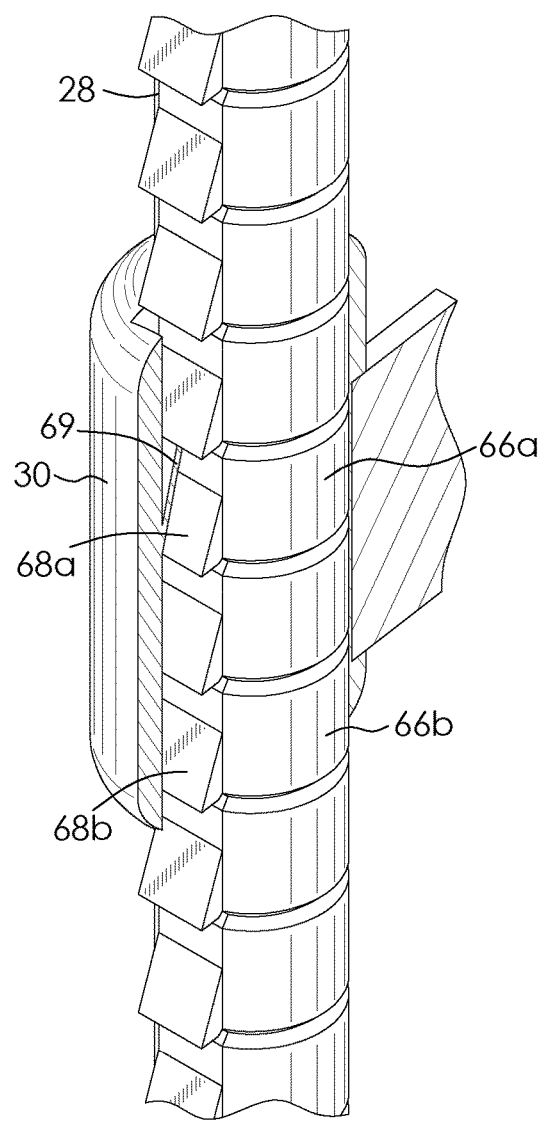
FIG. 15 is a fragmentary, partially sectional view of a track of the resealable bag of FIG. 1.
Figure 16:
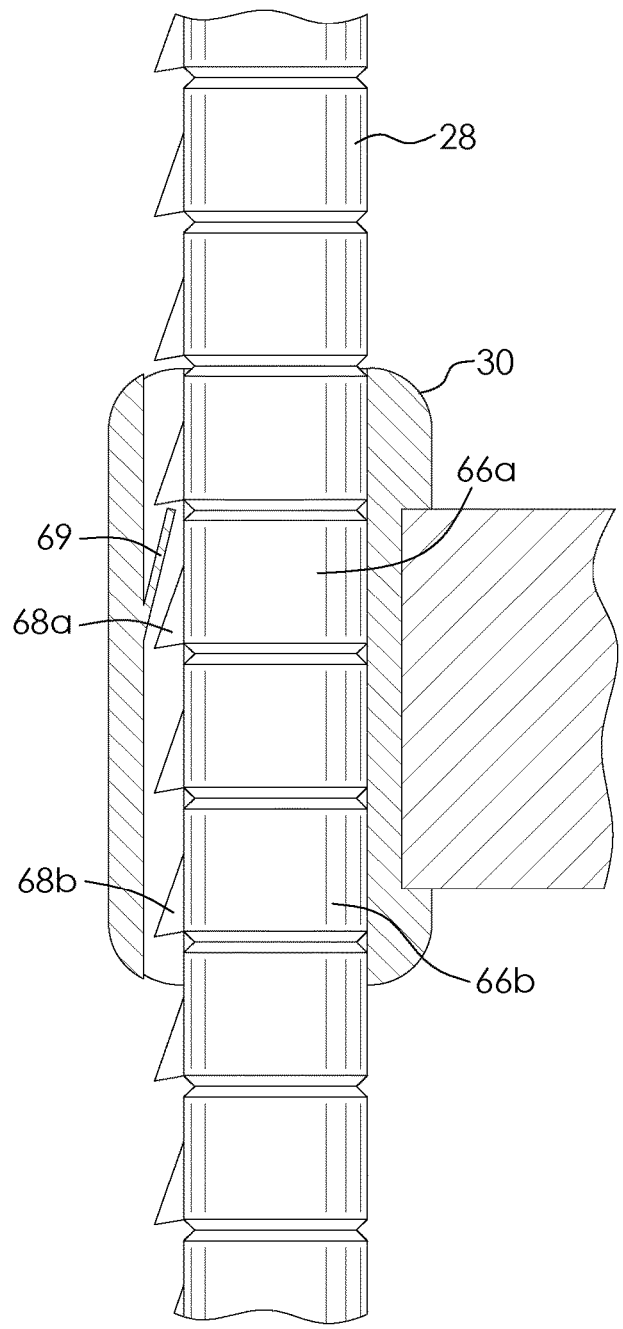
FIG. 16 is another fragmentary, partially sectional view of a track of the resealable bag of FIG. 1.

Referring now to FIGS. 15 and 16, the track 28 and coupling 30 are shown in greater detail. The track 28 includes a plurality of stacked members, for example, stacked members 66a and 66b. In this example, each of the stacked members 66a and 66b is generally annular in shape and is provided with a catch, such as catches 68a and 68b, on an outer surface thereof. The catches 68a and 68b are wedge-shaped and are configured to allow the coupling 30 to move in a first direction, downwards from the point of view of FIG. 15, along the track 28 but prevent movement of the coupling 30 in a second direction, upwards from the point of view of FIG. 15, along the track 28. A resilient flap 69 disposed on an interior surface of the coupling 30 is able to ride over the catches 68a and 68b in the first direction but movement in the second direction is prevented because the resilient flap 69 the catches 68a and 68b. The stacked members 66a and 66b may be snapped off the track 28. As shown in FIG. 6, this allows the track 28 to be shortened commensurate with the trimmed bag 10.

Figure 17:
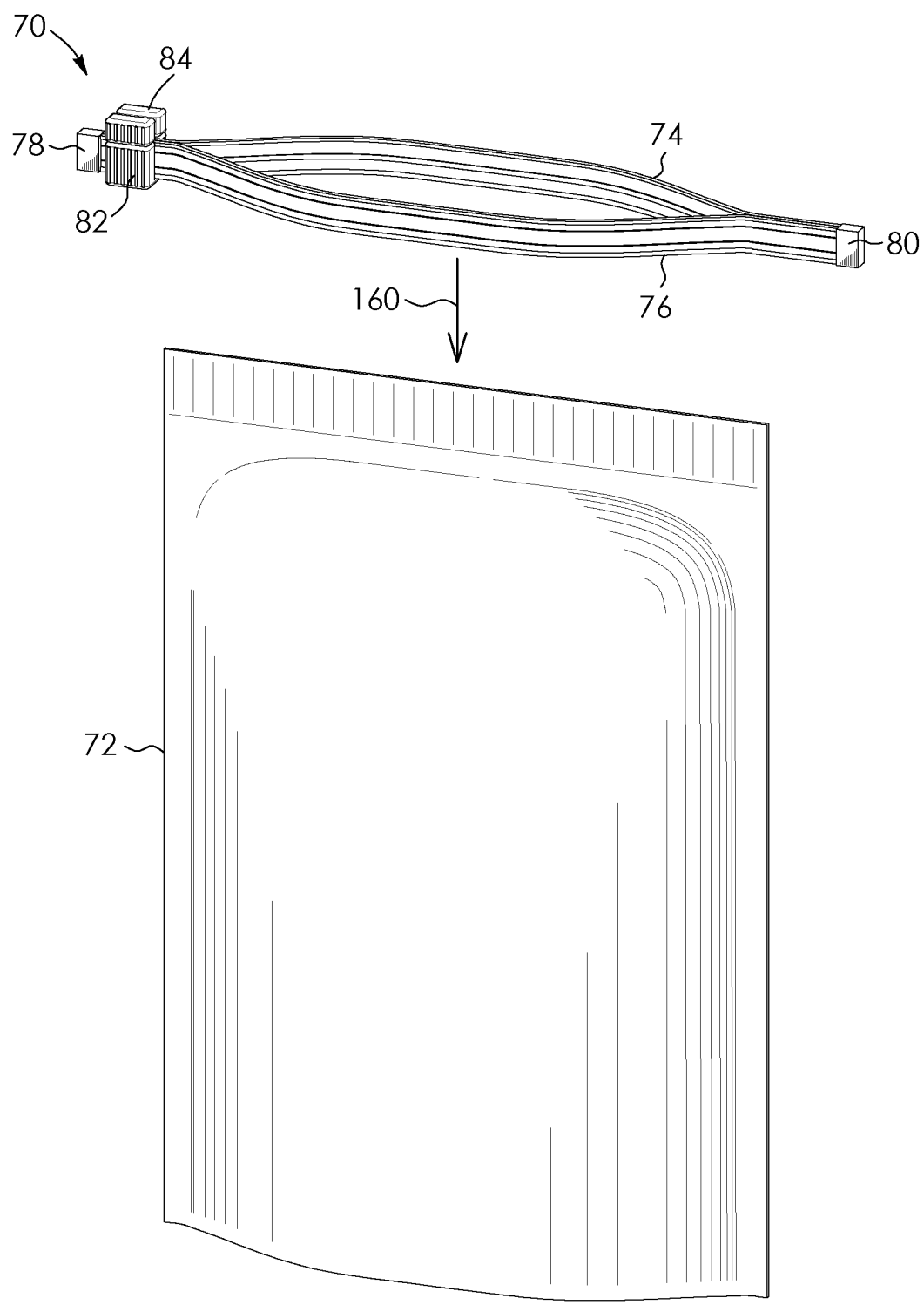
FIG. 17 is an exploded, perspective view showing a combination fastening mechanism and sealing mechanism and a sealed bag.
Figure 18:
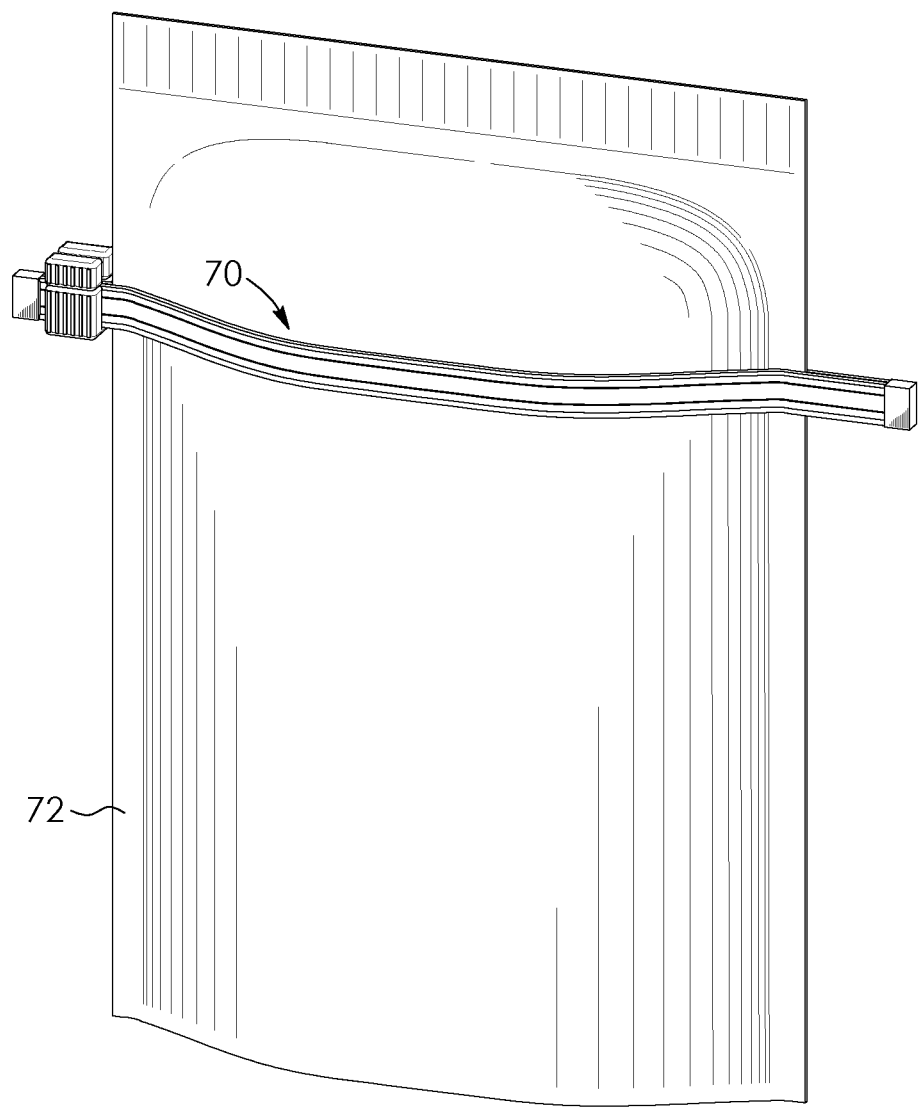
FIG. 18 is a perspective view showing the combination fastening mechanism and sealing mechanism and the sealed bag.

FIGS. 17 and 18 show a stand-alone, combination sealing and cutting assembly 70 which may engage a conventional non-resealable bag 72. The combination sealing and cutting assembly 70 comprises sealing strips 74 and 76 which are fused at their ends by end caps 78 and 80. There is a slider block 82 which is movable along the sealing strips 74 and 76. Movement of the slider block 82 along the sealing strips 74 and 76 in a first direction, to the right from the point of view of FIGS. 17 and 18, brings the sealing strips 74 and 76 into sealing engagement with one another and thereby seals the open bag. Movement of the slider block 82 along the sealing strips in a second direction, to the left from the point of view of FIGS. 17 and 18, releases the sealing strips 74 and 76 from one another and thereby opens the resealed bag. There is also a cutting mechanism 84 which, in this example, is mounted on the slider block 82. In other examples, the cutting mechanism and the slider block may be monolithic. Combination sealing and cutting mechanism 70 may be used to open, reseal and trim the bag 72.

It will be understood by a person skilled in the art that the term "seal" as used herein has a broad definition and means general occlusion between the interior of the bag and the external environment.

It will also be understood by a person skilled in the art that many of the details provided above are by way of example only, and are not intended to limit the scope of the invention which is to be determined with reference to the following claims.

What is claimed is:

1. A combination sealing and cutting assembly for a bag, the assembly comprising:
    a first sealing strip;
    a second sealing strip connected at ends thereof to corresponding ends of the first sealing strip;
    a slider block movable along the first sealing strip and the second sealing strip, movement of the slider block in a first direction bringing the first sealing strip and the second sealing strip into sealing engagement with one another, and movement of the slider block in a second direction releasing the first sealing strip and the second sealing strip from said sealing engagement; and
    a cutting mechanism mounted on the slider block, the cutting mechanism moving with the slider block along the first sealing strip and the second sealing strip, with the cutting mechanism in a non-operational position enabling the bag to slide therethrough, wherein the combination sealing and cutting assembly is fitted over the bag and the bag is releasably engaged between the first sealing strip and the second sealing strip to open, reseal and trim the bag.

2. The combination sealing and cutting assembly as claimed in claim 1 wherein the cutting mechanism has an operational position in which the bag is cut when the cutting mechanism moves with the slider block along the first sealing strip and the second sealing strip, and wherein in the non-operational position of the cutting mechanism the bag is not cut when the cutting mechanism moves with the slider block along the first sealing strip and the second sealing strip.

3. The combination as claimed in claim 1, wherein the cutting mechanism includes a first portion and a second portion, and wherein the cutting mechanism is actuated to an operational position by applying opposing forces to said first portion and said second portion.

4. The combination as claimed in claim 1 wherein the slider block includes a first portion connected to the first sealing strip and a second portion connected to the second sealing strip, and wherein the cutting mechanism comprises a first portion mounted on the first portion of the slider block and a second portion mounted on the second portion of the slider block.

5. The combination as claimed in claim 1, the bag having sides, wherein the cutting mechanism includes a blade, and wherein actuation of the cutting mechanism causes the blade to pierce through the sides of the bag.

6. The combination as claimed in claim 1, the bag having sides, wherein the cutting mechanism includes a first portion provided with a recess, wherein the cutting mechanism includes a second portion provided with a blade, and wherein actuation of the cutting mechanism causes the blade to pierce through the sides of the bag and be at least partially received within the recess.

7. The combination as claimed in claim 1, the combination further including the bag.

8. A combination sealing and cutting assembly for a bag, the bag having sides and side portions, and the assembly comprising:
    a first sealing strip;
    a second sealing strip connected at ends thereof to corresponding ends of the first sealing strip;
    a slider block movable along the first sealing strip and the second sealing strip, movement of the slider block in a first direction bringing the first sealing strip and the second sealing strip into sealing engagement with one another, and movement of the slider block in a second direction releasing the first sealing strip and the second sealing from said sealing engagement; and
    a cutting mechanism mounted on the slider block, the cutting mechanism moving with the slider block along the first sealing strip and the second sealing strip, the cutting mechanism including a first portion provided with a recess and a second portion provided with a blade, wherein actuation of the cutting mechanism causes the blade to pierce through the sides of the bag and be at least partially received within the recess, wherein the combination sealing and cutting assembly is fitted over the bag and the bag is releasably engaged between the first sealing strip and the second sealing strip to open and reseal the bag, and trim the side portions of the bag.

9. The combination sealing and cutting assembly as claimed in claim 8 wherein the cutting mechanism has an operational position in which the bag is cut when the cutting mechanism moves with the slider block along the first sealing strip and the second sealing strip, and a non-operational position in which the bag is not cut when the cutting mechanism moves with the slider block along the first sealing strip and the second sealing strip.

10. The combination as claimed in claim 8, the combination further including the bag.

11. The combination as claimed in claim 8, wherein the slider block includes a first portion connected to the first sealing strip and a second portion connected to the second sealing strip, and wherein the first portion of the cutting mechanism is mounted on the first portion of the slider block and the second portion of the cutting mechanism is mounted on the second portion of the slider block.

12. A combination sealing and cutting assembly for a bag, the assembly comprising:
- a first sealing strip;
- a second sealing strip connected at ends thereof to corresponding ends of the first sealing strip;
- a slider block movable along the first sealing strip and the second sealing strip, movement of the slider block in a first direction bringing the first sealing strip and the second sealing strip into sealing engagement with one another, and movement of the slider block in a second direction releasing the first sealing strip and the second sealing from said sealing engagement; and
- a cutting mechanism mounted on the slider block, the cutting mechanism moving with the slider block along the first sealing strip and the second sealing strip, the cutting mechanism including a first portion and a second portion, and the cutting mechanism being actuated to an operational position by applying opposing forces to said first portion and said second portion, wherein the combination sealing and cutting assembly is fitted over the bag and the bag is releasably engaged between the first sealing strip and the second sealing strip to open, reseal and trim the bag.

13. The combination sealing and cutting assembly as claimed in claim 12 wherein in the operational position the bag is cut when the cutting mechanism moves with the slider block along the first sealing strip and the second sealing strip, and wherein the cutting mechanism has a non-operational position in which the bag is not cut when the cutting mechanism moves with the slider block along the first sealing strip and the second sealing strip.

14. The combination as claimed in claim 12 wherein the slider block includes a first portion connected to the first sealing strip and a second portion connected to the second sealing strip, the first portion of the cutting mechanism mounting on the first portion of the slider block, and the second portion of the cutting mechanism mounting on the second portion of the slider block.

15. The combination as claimed in claim 12, the bag having sides, wherein the first portion of the cutting mechanism is provided with a recess, wherein the second portion of the cutting mechanism is provided with a blade, and wherein actuation of the cutting mechanism causes the blade to pierce through the sides of the bag and be at least partially received within the recess.

16. The combination as claimed in claim 12, the combination further including the bag.

* * * * *